(12) United States Patent
Bates et al.

(10) Patent No.: US 6,415,117 B1
(45) Date of Patent: Jul. 2, 2002

(54) SMART COVER PAGE FOR DUPLEX COPIER JOBS

(75) Inventors: Cary Lee Bates, Rochester, MN (US); Robert James Crenshaw, Apex, NC (US); Paul Reuben Day; John Matthew Santosuosso, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/782,838

(22) Filed: Feb. 14, 2001

(51) Int. Cl.$^7$ .............................................. G03G 15/00
(52) U.S. Cl. ....................................................... 399/84
(58) Field of Search .............................. 399/75, 82, 83, 399/84, 309, 364, 382; 358/468, 448; 271/3.05, 3.13, 258.01

(56) References Cited

U.S. PATENT DOCUMENTS

| | | | | |
|---|---|---|---|---|
| 4,201,464 A | | 5/1980 | Botte et al. .................. 399/382 |
| 4,248,528 A | * | 2/1981 | Sahay .......................... 399/84 |
| 4,847,656 A | * | 7/1989 | Kuno et al. .................... 399/84 |
| 5,051,779 A | * | 9/1991 | Hikawa ........................ 399/84 |
| 5,161,037 A | * | 11/1992 | Saito ........................ 358/468 |
| 5,257,082 A | | 10/1993 | Kobayashi et al. ........... 399/14 |
| 5,838,458 A | | 11/1998 | Tsai .......................... 358/402 |
| 5,839,019 A | | 11/1998 | Ito .............................. 399/45 |
| 5,859,711 A | | 1/1999 | Barry et al. ................. 358/296 |
| 5,896,202 A | * | 4/1999 | Ozaki ......................... 358/296 |
| 5,966,556 A | | 10/1999 | Nakagawa et al. ........... 399/18 |

* cited by examiner

Primary Examiner—Sophia S. Chen
Assistant Examiner—Hoan Tran
(74) Attorney, Agent, or Firm—Andrew Dillon

(57) ABSTRACT

Control over the output of duplex or double-sided copying is facilitated by indicator pages identifying an original page which should be copied to the front side of a new copy page, even if the back side of a previous copy page must be left blank in order to do so. Special separator pages containing detectable indicia such as a bar code may be inserted within single-side originals immediately prior to a page which should be printed on the front side of a duplex copy page to serve as the indicator page. Pages with unique, detectable content such as white space followed by large-print chapter or section headings may be employed as the indicator page, identifying the respective page as a page which should be printed on the front side of a new duplex copy page. Special dual-form separator pages containing different detectable indicia identifying either the front or back of a subsequent duplex original page may be employed to start each new chapter or section within a duplex original on a new page within the copy even if some chapters or sections within the original start on the back of a page, Indicator pages may also alter copy characteristics such as darkness and enlargement/reduction for the respective identified pages.

21 Claims, 2 Drawing Sheets

SMART COVER PAGE FOR DUPLEX COPIER JOBS

BACKGROUND OF THE INVENTION

1. Technical Field

The present invention relates generally to copying documents and in particular to duplex copying of originals. Still more particularly, the present invention relates to copying a specific page within an original to a front side of a duplex copy page.

2. Description of the Related Art

Duplex or double-sided copying of paper documents saves money and reduces paper waste, and is therefore mandated by many companies and government agencies, even for documents which are originally single-sided. In particular, single-sided to double-sided copying is frequently necessary for documents containing original content since most printers are only capable of single-sided printing. The original in such cases is therefore often single-sided, although the copy or copies should be double-sided.

However, single-sided to double-sided copying is complicated by the need to correlate pages. If multiple single-sided originals are loaded into a copier document feeder for double-sided copying and one of the originals contains an odd number of pages, the first page of document the odd-sized document will be copied onto the back of the last page of the odd-sized document, so that the copies cannot be separated. Additionally, single-sided original documents having multiple sections or chapters, where the user wants the first page of each chapter or section to be printed on the front side of a new page in a double-sided copy, will have the same problem where a chapter or section has an odd number of pages.

Duplex copying of double-sided originals is attended by similar problems. The user may wish copies of the original to be separated as specific breaks (such as chapter headings) so that each copied portion may be stapled and distributed separately. The first page of a desired separate copy section may be located on the back side of a duplex original, requiring that page of the original to be manually copied for both copy sections (the new copy section starting with the first page and the preceding copy section).

It would be desirable, therefore, to enable a copier creating a duplex copy from an original to recognize that a particular page must be copied to the front side of a copy page and to start each new document or document portion within the original(s) on a new page.

SUMMARY OF THE INVENTION

It is therefore one object of the present invention to provide improved copying of documents.

It is another object of the present invention to provide improved duplex copying of original documents.

It is yet another object of the present invention to enable copying of a specific page within an original to a front side of a duplex copy page.

The foregoing objects are achieved as is now described. Control over the output of duplex or double-sided copying is facilitated by indicator pages identifying an original page which should be copied to the front side of a new copy page, even if the back side of a previous copy page must be left blank in order to do so. Special separator pages containing detectable indicia such as a bar code may be inserted within single-side originals immediately prior to a page which should be printed on the front side of a duplex copy page to serve as the indicator page. Pages with unique, detectable content such as white space followed by large-print chapter or section headings may be employed as the indicator page, identifying the respective page as a page which should be printed on the from side of a new duplex copy page. Special dual-form separator pages containing different detectable indicia identifying either the front or back of a subsequent duplex original page may be employed to start each new chapter or section within a duplex original on a new page within the copy even if some chapters or sections within the original start on the back of a page. Indicator pages may also alter copy characteristics such as darkness and enlargement/reduction for the respective identified pages.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
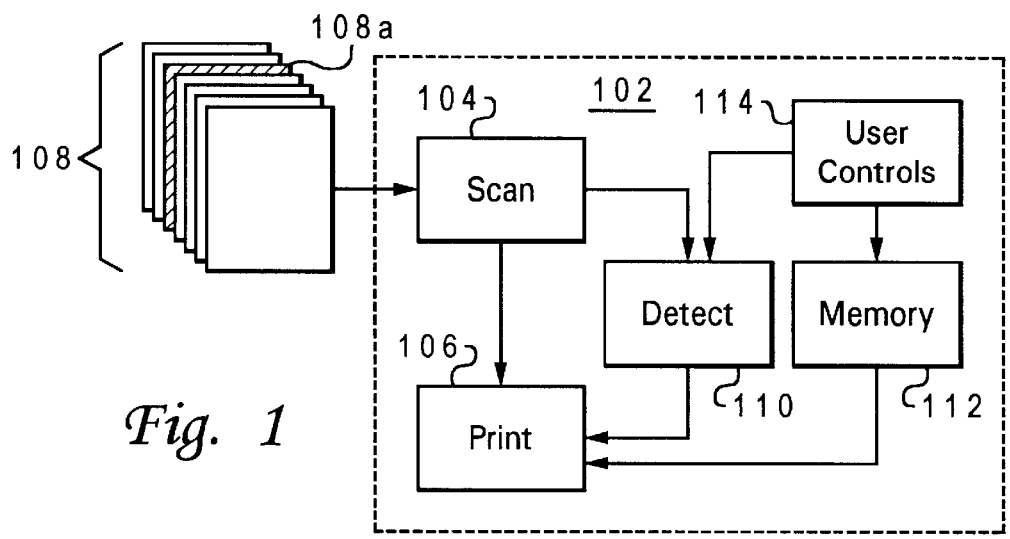
FIG. 1 depicts a block diagram of a copying system enabling copying of a specific page within a single-sided original to a front side of a duplex copy page in accordance with a preferred embodiment of the present invention.

With reference now to the figures, and in particular with reference to FIG. 1, a block diagram of a copying system enabling copying of a specific page within a single-sided original to a front side of a duplex copy page in accordance with a preferred embodiment of the present invention is depicted. The present invention may be implemented within copiers constructed and operating in accordance with the known art, and only so much of the copiers construction and operation as is necessary for an understanding of the present invention is depicted.

Copier system 102 includes a scanning unit 104 which optical scans pages being copied to acquire an electronic image of such pages. A print unit 106 prints pixels on pages based upon the acquired images, and is capable in the present invention of selective duplex or double-sided printing and copying of single-sided originals onto double-sided copies. Scanning unit 104 scans originals 108 within a document feeder for copier system 102 and passes image information to print unit 106. Originals 108 include one or more indicator pages 108a which identify pages within originals 108 which are to be copied to the front side of a copy page.

Detect unit 110 within copier system 102 receives page image information from scanning unit 104 and detects indicator pages 108a within originals 108. Indicator page or pages 108a identify a page within the original which is to be copied onto the front side of a new copy page. The indicator page 108a is either a special separator page inserted among the originals just before the page to be copied onto the front side of a new copy page, or it may be the actual page which is to be copied onto the front side of a new copy page itself, as described in greater detail below.

Upon detecting an indicator page 108a within originals 108, detect unit 110 signals print unit 108 to print the identified page on the front side of a new copy page. If the copier system prints the pages in sequence as the pages are scanned, a "hard page" may be signaled by the copier system, forcing a blank page on the back side of the last copy page printed. If the copier system scans all of the pages and stores the scanned page images in memory before printing any pages, a code prompting the proper printing may be stored in memory with the identified page.

Figures 2A, 2B:
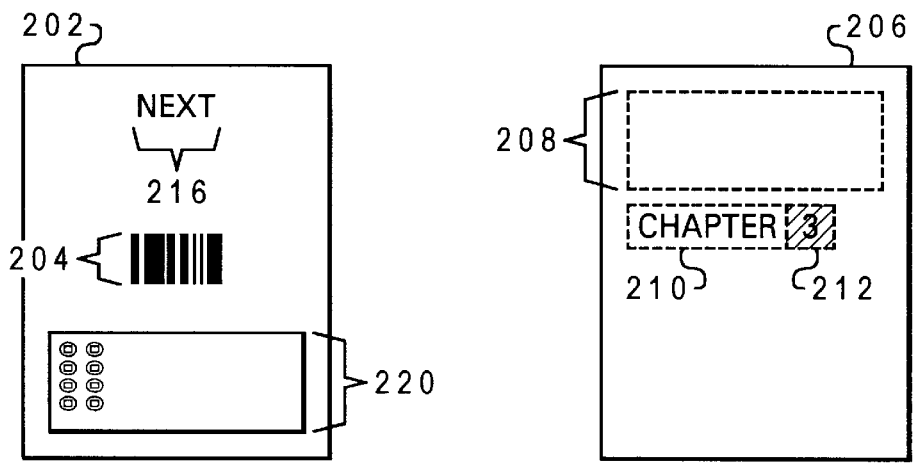
FIGS. 2A–2C are diagrams of indicator pages employed to identify pages within a single-sided original which are to be copied onto the front page of a new duplex copy page in accordance with a preferred embodiment of the present invention.
Figure 2C:
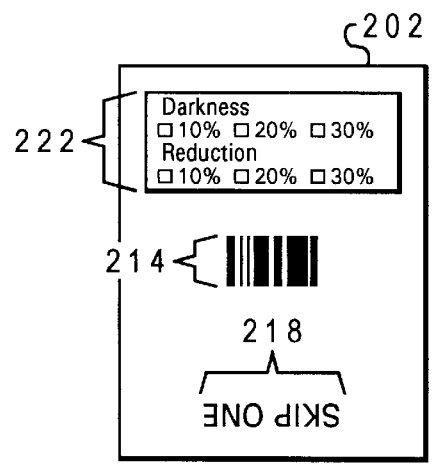

Referring to FIGS. 2A through 2C, which are intended to be read in conjunction with FIG. 1, diagrams of indicator pages employed to identify pages within a single-sided original which are to be copied onto the front page of a new duplex copy page in accordance with a preferred embodiment of the present invention are illustrated. Each of the pages shown serve as an indicator page 108a as described above within an embodiment of the present invention.

FIG. 2A illustrates a special separator page which is inserted among the pages of the original just before the original page which is to be copied onto the front side of a new copy page. Separator page 202 is not copied, but merely controls printing of the duplex output. Separator page 202 includes indicia, bar code 204 in the example shown, identifying the page as an indicator page 108a. Separator page 202 indicates that the next immediately following page within the original 108 being copied is to be copied onto the front side of a new copy page. Indicia 204, when detected and recognized by copier system 102, prompts the copier system 102 to start copying of the next page and subsequent pages within the original 108 on a new page. Indicia 204 is also stored within memory 112 in copier system 102 so that the user, employing user controls 114, may print one or more separator pages 202 as needed for a copy job, either keeping a supply of separator pages 202 next to copier system 102 or simply printing new separator page 202 when needed.

FIG. 2B illustrates an embodiment of the present invention which does not employ special separator pages. In this embodiment, an actual original page 206 from the original is employed as an indicator page 108a. The user places a "cover page" 206 which is a page to be copied onto the front side of a new copy page and which contains content in a configuration unique to similar pages within the original, such as the first page beginning a new chapter or section within the original 108. Original page 206 thus establishes a template for detecting pages within the original which are to copied onto the front side of a new copy page.

The user places original page 206 in the copy to be scanned and selects an option utilizing user controls 114 to cause copier system 102 to scan the page into memory 112 as a template for all similar cover pages within the original 108. As the entire original 108 is being copied, detect unit 110 within the copier system 102 watches for pages which fit the template configuration. When such a page is encountered within the original, the copier system 102 ensures that the respective page is copied on the front of a new page. This feature is also useful for copying originals which are duplex and are being copied onto a duplex copy, but which the user wishes to be separated as specific breaks (such as chapter headings) so that each copied portion may be stapled and distributed separately. In this manner, a new page break may be obtained where the duplex original does not have a page break, with the cover page on the back side of a duplex original so that a separator page cannot be inserted between the page to be printed on the front side of a new page and the immediately preceding page within the original.

To assist the copier system 102 in recognizing unique features of the original cover page template 206, the copier may present a soft copy of the scanned page on a display (not shown) and prompt the user to select or highlight those unique portions of the content which are to be employed in identifying subsequent cover pages which are to be copied onto the front of a new page. In the example shown in FIG. 2B, the user may designate portions of the cover page content including white space 208 and large-print chapter heading 210 which are common to all chapter heading pages and distinguish such pages (indicator pages 108a) from other pages within original 108. The user might also designate portions which are to be ignored by the copier system, such as the chapter number 212.

FIG. 2C illustrates another separator page, or more specifically an extension of the separator page 202 shown in FIG. 2A, which is employed with duplex originals. As described above, separator page 202 is not copied, but merely controls printing of the duplex output. In this embodiment, however, separator page 202 has two forms: one which indicates that the front side of the subsequent original page should be copied to a front side of a copy page, and one which indicates that the back side of the next original page should be copied onto a front side of a new copier page.

This embodiment of separator page 202 may be implemented as two separate sheets or, as shown in the example of FIGS. 2A and 2C, as a single double-sided sheet with indicia 204 and 214 on opposite sides. Different indicia (e.g., different bar codes) or, as in the exemplary embodiment shown, different orientations 204 and 214 of the indica may be employed to distinguish the separator page form employed. In addition, different legends ("NEXT") 216 and ("SKIP ONE") 218 may be employed, with different locations and different orientations. In the example shown, FIGS. 2A and 2C are opposite sides of a single sheet which has not been altered in orientation (simply flipped over). In operation, the user would orient the side shown in FIG. 2C within the originals so that the legend is correctly shown at the top of the sheet and oriented correctly with the originals, thus altering the orientation of indicia 214.

Dual-form separator page 202 shown in FIGS. 2A and 2C is useful for duplex originals of the type described above, where the chapter headings within the original are not necessarily on the front side of an original page, but may appear on the back side, and particularly where the original includes chapter or section starts on both the front and back of various original pages. The same separator (indicator) page 202 may therefore be utilized throughout the original with orientation dictating which side of the subsequent original page is copied onto the front of a new copy page.

With the dual-form embodiment of FIGS. 2A and 2C, if the separator page 202 is placed face up within the original, the copier system begins copying of the front side of the next page and subsequent pages within the original on the front side of a new copy page. If the separator page is placed face down among the original pages, the copier system copies the front side of the next original page in whatever manner is appropriate (either onto the back side of the last copy page or the front side of a new copy page), and then starts copying of the back side of that next original page and subsequent pages on the front side of a new copy page. In this manner, the separator page 202 may be employed to divide a duplex original into sections each starting on a new page within the copy, even though the original is continuous and sections within the original may start on either the front or back of a page.

Indicator pages 108a in accordance with the present invention may also be employed to control special copying characteristics, such as copy darkness or enlargement/reduction, allowing the user to apply these copy options to each of the identified pages without having to copy those pages separately from the rest of the original page each time a copy is made. In one embodiment, illustrated in FIG. 2A, a pictorial representation 220 of the control keys on the copier control pad may be displayed, with boxes which a user may darken to effectively actuate such controls for that page. Another embodiment, illustrated in FIG. 2C, provides a set 222 of boxes for the user to darken to select the desired darkness, reduction, etc.

Figure 3:
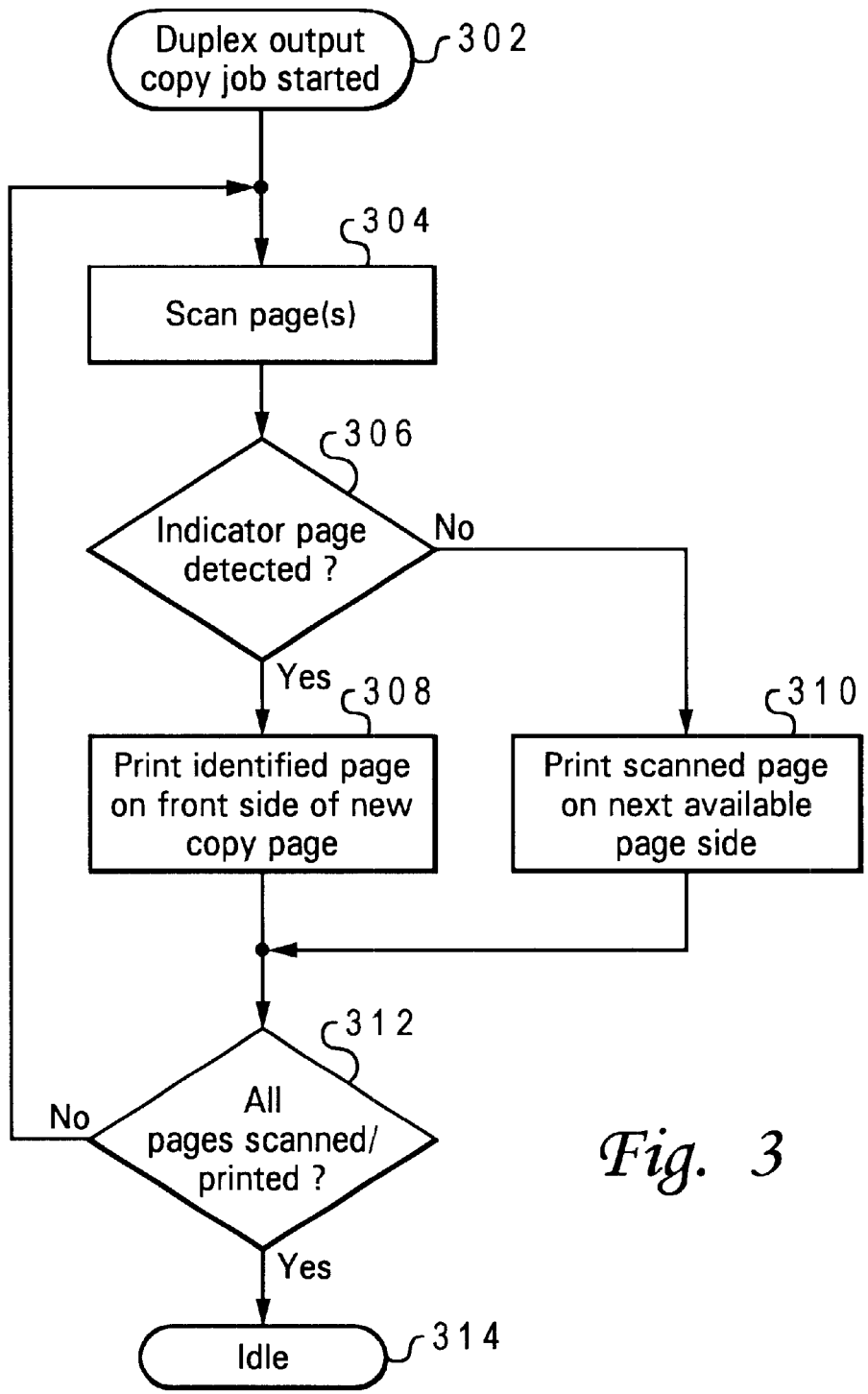
FIG. 3 depicts a high level flow chart for a process of controlling duplex copier output in accordance with a preferred embodiment of the present invention.

With reference now to FIG. 3, a high level flow chart for a process of controlling duplex copier output in accordance with a preferred embodiment of the present invention is depicted. In the exemplary embodiment, each page is printed after being scanned before the next page is scanned, except in the case of separator pages, which are not printed as part of the copy. However, the process may be readily modified for an embodiment in which all original pages are scanned before any copy page is printed, or in which scanning and printing proceed concurrently.

The process depicted in FIG. 3 begins at step 302, which depicts a duplex output copy job being started by the user. The process passes first to step 304, which illustrates scanning one or more pages of the original (if an indicator page is detected, at least the front, and possibly both the front and back, of the subsequent page may also be scanned), and then to step 306, which depicts a determination of whether an indicator page has been detected by the copier within the scanned pages. The indicator page may be any of the types of indicator pages described above, or any similar page identifying a page which should be printed on the front side of a new duplex copy page.

If an indicator page has been detected, the process proceeds to step 308, which illustrates printing the identified page—which is either the indicator page itself or the front or back side of a page immediately following the indicator page, depending on the embodiment—on the front side of a new duplex copy page. If necessary, the back of a previous duplex copy page is left blank. If an indicator page was not detected within the scanned page(e), however, the process proceeds instead to step 310, which depicts printing the scanned page on the next available side of a copy page, whether front or back. Thus, pages subsequent to a page identified by an indicator page are printed alternately on both sides of subsequent duplex copy pages until another indicator page is detected.

The process passes next to step 312, which illustrates a determination of whether all original pages have been scanned and printed. If not, the process returns to step 304 to scan the next page within the original. If so, however, the process proceeds instead to step 314, which depicts the process becoming idle until another duplex output copy job is started by the user.

It is important to note that while the present invention has been described in the context of a fully functional duplicating system and/or data processing system network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution or the duplicating system used to perform the operations of the duplicating system. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links. Examples of duplicating systems include photocopiers, telecopier or facsimile machines, general-purpose data processing systems equipped with scanning and printing equipment, high-volume printing systems, and other technologies which reproduce documents in tangible.

While the invention has been particularly shown and described with reference to a preferred embodiment, it will be understood by those skilled in the art that various changes in form and detail may be made therein without departing from the spirit and scope of the invention.

What is claimed is:

1. A method of controlling double-sided copier output, comprising:

scanning pages within an original for printing onto pages within a duplex copy, wherein said original includes a leading original page and one or more non-leading original pages that all follow the leading original page in page sequence and wherein said duplex copy has a leading copy page and one or more non-leading copy pages that all follow the leading copy page in page sequence; and responsive to detecting an indicator page within the original pages which identifies a non-leading original page to be copied onto a front side of a non-leading copy page, forcing printing of the identified non-leading original page onto the front side of a non-leading copy page within the duplex copy.

2. The method of claim 1, further comprising:

detecting an indicator page within the original pages which designates a next page within the non-leading original pages to be copied onto a front side of a non-leading copy page.

3. The method of claim 2, wherein the step of detecting an indicator page further comprises:

detecting an indicator which designates a front side of the next page within single-sided original pages to be copied onto the front side of the non-leading copy page.

4. The method of claim 1, wherein the step of detecting an indicator page further comprises:

detecting a bar code on the indicator page.

5. The method of claim 4, further comprising:

determining which side of the identified non-leading original page is to be copied onto the front side of the non-leading copy page from an orientation of the bar code on the indicator page.

6. A method of controlling double-sided copier output, comprising:

scanning pages within an original for printing onto pages within a duplex copy;

detecting an indicator page within the original pages which designates a next page within the original pages to be copied onto a front side of a new copy page, wherein the step of detecting an indicator page includes detecting an indicator which designates a back side of the next page within double-sided original pages to be copied onto the front side of the new copy page; and responsive to detecting an indicator page within the original pages which identifies an original page to be copied onto a front side of a new copy page, forcing printing of the identified original page onto the front side of a new copy page within the duplex copy.

7. A method of controlling double-sided copier output, comprising:

scanning pages within an original for printing onto pages within a duplex copy;

detecting an indicator page within the original pages which designates a next page within the original pages to be copied onto a front side of a new copy page, wherein the step of detecting an indicator page includes detecting predetermined formatting on the indicator page, the predetermined formatting including white space and text for a portion of a heading; and responsive to detecting an indicator page within the original pages which identifies an original page to be copied onto a front side of a new copy page, forcing printing of the identified original page onto the front side of a new copy page within the duplex copy.

8. A system for controlling double-sided copier output, comprising:

a scanning unit scanning pages within an original for printing onto pages within a duplex copy, wherein said original includes a leading original page and one or more non-leading original pages that all follow the leading original page in page sequence and wherein said duplex copy has a leading copy page and one or more non-leading copy pages that all follow the leading copy page in page sequence; and a control unit that, responsive to detection by the scanning unit of an indicator page within the original pages which identifies a non-leading original page to be copied onto a front side of a non-leading copy page, forces printing of the identified non-leading original page onto the front side of a non-leading copy page within the duplex copy.

9. The system of claim 8, further comprising:

means within the scanning unit for detecting an indicator page within the original pages which designates a next page within the non-leading original pages to be copied onto a front side of a non-leading copy page.

10. The system of claim 9, wherein the means for detecting an indicator page further comprises:

means for detecting an indicator which designates a front side of the next page within single-sided original pages to be copied onto the front side of the non-leading copy page.

11. The system of claim 8, wherein the means for detecting an indicator page further comprises:

means for detecting a bar code on the indicator page.

12. The system of claim 11, further comprising:

means for determining which side of the identified non-leading original page is to be copied onto the front side of the non-leading copy page from an orientation of the bar code on the indicator page.

13. A system for controlling double-sided copier output, comprising:

a scanning unit scanning pages within an original for printing onto pages within a duplex copy; and a control unit that, responsive to detection by the scanning unit of an indicator page within the original pages which identifies an original page to be copied onto a front side of a new copy page, forces printing of the identified original page onto the front side of a new copy page within the duplex copy, wherein the means for detecting an indicator page includes means for detecting an indicator which designates a back side of the next page within double-sided original pages to be copied onto the front side of the new copy page.

14. A system for controlling double-sided copier output, comprising:

a scanning unit scanning pages within an original for printing onto pages within a duplex copy; and a control unit that, responsive to detection by the scanning unit of an indicator page within the original pages which identifies an original page to be copied onto a front side of a new copy page, forces printing of the identified original page onto the front side of a new copy page within the duplex copy, wherein the means for detecting an indicator page includes means for detecting predetermined formatting on the indicator page, the predetermined formatting including white space and text for a portion of a heading.

15. A computer program product within a computer usable medium for controlling double-sided copier output, comprising:

instructions for scanning pages within an original for printing onto pages within a duplex copy, wherein said original includes a leading original page and one or more non-leading original pages that all follow the leading original page in page sequence and wherein said duplex copy has a leading copy page and one or more non-leading copy pages that all follow the leading copy page in page sequence; and instructions, responsive to detecting an indicator page within the original pages which identifies non-leading original page to be copied onto a front side of a non-leading copy page, for forcing printing of the identified non-leading original page onto the front side of a non-leading copy page within the duplex copy.

16. The computer program product of claim 15, further comprising:

instructions for detecting an indicator page within the original pages which designates a next page within the non-leading original pages to be copied onto a front side of a non-leading copy page.

17. The computer program product of claim 16, wherein the instructions for detecting an indicator page further comprise:

instructions for detecting an indicator which designates a front side of the next page within single-sided original pages to be copied onto the front side of the non-leading copy page.

18. The computer program product of claim 15, wherein the instructions for detecting an indicator page further comprise:

instructions for detecting a bar code on the indicator page.

19. The computer program product of claim 18, further comprising:

instructions for determining which side of the identified non-leading original page is to be copied onto the front side of the non-leading copy page from an orientation of the bar code on the indicator page.

20. A computer program product within a computer usable medium for controlling double-sided copier output, comprising:

instructions for scanning pages within an original for printing onto pages within a duplex copy instructions, responsive to detecting an indicator page within the original pages which identifies an original page to be copied onto a front side of a new copy page, for forcing printing of the identified original page onto the front side of a new copy page within the duplex copy, wherein the instructions for detecting an indicator page include instructions for detecting an indicator which designates a back side of the next page within double-sided original pages to be copied onto the front side of the new copy page.

21. A computer program product within a computer usable medium for controlling double-sided copier output, comprising:

instructions for scanning pages within an original for printing onto pages within a duplex copy instructions, responsive to detecting an indicator page within the original pages which identifies an original page to be copied onto a front side of a new copy page, for forcing printing of the identified original page onto the front side of a new copy page within the duplex copy, wherein the instructions for detecting an indicator page include instructions for detecting predetermined formatting on the indicator page, the predetermined formatting including white space and text for a portion of a heading.

* * * * *